United States Patent [19]

Erdman

[11] 4,275,006
[45] Jun. 23, 1981

[54] PROCESS OF PREPARING DISPERSANT LUBRICATING OIL ADDITIVES

[75] Inventor: Timothy R. Erdman, San Rafael, Calif.

[73] Assignee: Chevron Research Company, San Francisco, Calif.

[21] Appl. No.: 966,179

[22] Filed: Dec. 4, 1978

[51] Int. Cl.$^3$ ............ C07D 207/12; C10M 1/38
[52] U.S. Cl. .................. 260/326.5 SF; 252/34; 252/47.5; 260/326.5 S; 260/326.5 F
[58] Field of Search ............... 252/47.5, 34; 260/326.5 SF, 326.5 F, 326.5 S

[56] References Cited

U.S. PATENT DOCUMENTS

| | | | |
|---|---|---|---|
| 2,461,341 | 2/1949 | Morris et al. | 252/47.5 X |
| 2,530,070 | 11/1950 | Morris et al. | 252/47.5 X |
| 3,451,166 | 6/1969 | Panzer | 252/47.5 |
| 3,470,098 | 9/1969 | O'Halloran | 252/47.5 |
| 3,715,368 | 2/1973 | Mehmedbasich | 260/326.5 SF X |
| 3,725,434 | 4/1973 | Elliott et al. | 252/47.5 X |
| 3,846,316 | 11/1974 | Schiff et al. | 252/47.5 X |
| 4,025,451 | 5/1977 | Plonsker et al. | 252/47.5 |
| 4,070,295 | 1/1978 | Miller | 252/47.5 X |
| 4,122,021 | 10/1978 | Loveless et al. | 252/47.5 X |
| 4,122,266 | 10/1978 | de Vries | 252/47.5 X |

*Primary Examiner*—Andrew Metz
*Attorney, Agent, or Firm*—D. A. Newell; J. M. Whitney; V. J. Cavalieri

[57] ABSTRACT

Dispersant lubricating oil additives are prepared by reacting oil-soluble dispersant compositions containing at least one primary or secondary amino group with SO$_2$.

2 Claims, No Drawings

PROCESS OF PREPARING DISPERSANT LUBRICATING OIL ADDITIVES

BACKGROUND OF THE INVENTION

1. Field of the Invention

Lubricating oil additives are prepared by reacting a dispersant composition containing at least one primary or secondary amino group with $SO_2$.

2. Description of the Prior Art

Most commercial lubricating oils now contain dispersant additives to help keep the engine clean by dispersing sludge and varnish-forming deposits in the oil. Many of these additives contain nitrogen. Many recently developed additives combine dispersant activity with viscosity index improving characteristics. Additives which function in this manner are variously known in the art as detergent additives or dispersant additives. For the purposes of this description, the term "dispersant" is intended to include both dispersant and detergent additives.

U.S. Pat. No. 3,741,998 teaches the preparation of aqueous detergents via a two-stage process which comprises: (1) forming an adduct of sulfur dioxide or sulfur trioxide and a quaternary amine; and (2) reacting this adduct with an aziridinyl compound.

U.S. Pat. No. 3,843,722 teaches the preparation of alkyl amidosulfinic acid (bis-alkylamine) salts, useful as analytical reagents, by reacting an amine containing 1–20 carbon atoms with $SO_2$.

SUMMARY OF THE INVENTION

It has now been found that the dispersant performance in both diesel and gasoline engines of nitrogen-containing lubricating oil additives having at least one primary or secondary amino group is improved by reaction with $SO_2$. The resistance to oxidation of lubricating oil compositions containing the product is also improved while the corrosivity to lead bearings is reduced. In addition, while dispersants may adversely affect wear performance in formulated oils, the $SO_2$-treated dispersants do not degrade and may also improve wear performance.

DETAILED DESCRIPTION OF THE INVENTION

The reaction of $SO_2$ with the nitrogen-containing dispersants described below leads, it is believed, to the formation of amidosulfurous acids and amidosulfurous acid ammonium salts. The salts are formed when one mol of $SO_2$ reacts with two basic nitrogens, either in the same or different molecules. While other structures are possible, these salts are believed to have one of the general formulas (where R represents hydrogen or a hydrocarbyl-based substituent):

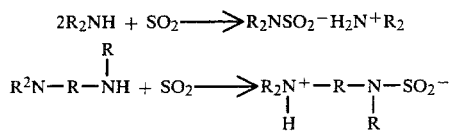

The basic nitrogens are either primary amino ($—NH_2$) or secondary amino ($=NH$) groups.

THE NITROGEN-CONTAINING DISPERSANTS

The dispersants whose performance is improved by the process of this invention must contain at least one basic nitrogen and have at least one $>NH$ group. The particular dispersant used and its structure or method of preparation is not critical to the invention so long as the dispersant contains at least one primary or secondary amino group. The essence of this invention resides in the surprising discovery that treating the dispersant with $SO_2$ improves the dispersant properties, while improving resistance to oxidation and decreasing the corrosivity to lead bearings. The dispersants include hydrocarbyl succinimides having at least one additional amino group, hydrocarbyl-substituted polyamines, Mannich bases, borated Mannich bases, hydrocarbyl sulfonamides having at least one additional amino group, N-alkylaminophosphoramides, polyoxyalkylene polyamines, and amino-decorated hydrocarbon polymers useful as dispersant-viscosity index improvers.

Succinimide compositions useful for preparing the additives of this invention are well known in the art. A general method for their preparation is found in U.S. Pat. Nos. 3,219,666, 3,172,892 and 3,272,746, the disclosures of which are incorporated herein by reference. These compositions are prepared by reacting an alkyl or alkenyl succinic acid or anhydride with a nitrogen-containing compound. For the purposes of this invention, the nitrogen-containing compound must be of a type such that the resultant product contains at least one primary or secondary amino group. The succinimide may be of the type commonly known as mono- or bis-succinimide. Preferred nitrogen compounds are those commonly known as ethylene amines. Particularly preferred are triethylenetetraamine and tetraethylenepentamine. The preferred alkyl or alkenyl groups contain from 50 to 300 carbon atoms and is most preferably polyisobutenyl.

The hydrocarbyl-substituted polyamines are also well known. A method for their preparation is found in U.S. Pat. No. 3,565,804, the disclosure of which is hereby incorporated by reference. These compounds are high-molecular-weight hydrocarbyl-N-substituted alkylene polyamines. They have an average molecular weight in the range of about 600–10,000 more usually in the range of about 750–5000.

The hydrocarbyl radical may be aliphatic or alicyclic and, except for adventitious amounts of aromatic structure in petroleum mineral oils, will be free of aromatic unsaturation. The hydrocarbyl groups will normally be branched-chain aliphatic, having 0–2 sites of unsaturation, and preferably from 0–1 site of ethylenic unsaturation. The hydrocarbyl groups are preferably derived from petroleum mineral oil, or polyolefins, either homopolymers or higher-order polymers, or 1-olefins of from 2–6 carbon atoms. Ethylene is preferably copolymerized with a higher olefin to insure oil solubility.

Illustrative polymers include polypropylene, polyisobutylene, poly-1-butene, etc. The polyolefin group will normally have at least 1 branch per 6 carbon atoms along the chain, preferably at least 1 branch per 4 carbon atoms along the chain, and it is particularly preferred that there be from 0.3 to 1 branch per carbon atom along the chain. These branched-chain hydrocarbons are readily prepared by the polymerization of olefins of from 3–6 carbon atoms and preferably from olefins of from 3–4 carbon atoms.

In preparing the compositions of this invention, rarely will a single compound having a defined structure be employed. With both polymers and petroleum-derived hydrocarbon groups, the composition is a mixture of materials having various structures and molecular weights. Therefore, in referring to molecular weight, average molecular weights are intended. Furthermore, when speaking of a particular hydrocarbon group, it is intended that the group include the mixture that is normally contained within materials which are commercially available. For example, polyisobutylene is known to have a range of molecular weights and may include small amounts of very-high-molecular-weight materials.

Similarly, commercially available alkylene polyamines are frequently mixtures of various alkylene polyamines having one or two species dominating. Finally, in preparing the compounds of this invention, where the various nitrogen atoms of the alkylene polyamine are not equivalent, the product will be a mixture of the various possible isomers.

Particularly preferred polyamines are prepared from polyisobutenyl chloride and ethylenediamine or triethylenetetraamine.

The Mannich bases used for preparing the additives of this invention are also well known. Representative types of Mannich bases are described in U.S. Pat. Nos. 3,741,896, 3,539,633 and 3,649,229, the disclosures of which are hereby incorporated by reference. In general, the Mannich bases are prepared by reacting an alkylphenol, formaldehyde, and a mono- or polyamine. The Mannich base may be borated by reacting with, e.g., a boron halide, boric acid, or an ester of boric acid. Preferred amines for use in forming the Mannich base are methylamine and ethyleneamines such as ethylenediamine, diethylenetriamine, and triethylenetetraamine.

The hydrocarbyl sulfonamides for use in preparing the additives of this invention are described in U.S. Ser. No. 644,474, filed Dec. 29, 1975, the disclosure of which is hereby incorporated by reference. The sulfonamides are preferably prepared from a hydrocarbyl sulfonyl chloride and an amine. Particularly preferred are the reaction products of polyisobutenyl-sulfonyl chloride containing 50 to 300 carbon atoms and an ethylene amine such as diethylenetriamine, triethylenetetraamine, and tetraethylenepentamine.

The polyoxyalkylene polyamines can be prepared by forming an oxyalkylenated chloroformate and then reacting with an amine. Dispersants of this type are disclosed in copending U.S. Ser. Nos. 914,427, 917,150 and 891,879, the entire disclosures of which are hereby incorporated by reference.

Amino-decorated hydrocarbon polymers useful as dispersant viscosity index improvers are usually prepared by treating a hydrocarbon polymer having viscosity index improving characteristics, such as an ethylene-propylene copolymer or terpolymer, either chemically or mechanically to generate active sites and then reacting with an amine or polyamine. Typical products are prepared by oxidizing the copolymer or terpolymer and reacting with an amine as shown in U.S. Pat. No. 3,769,216 or with an amine an aldehyde as shown in U.S. Pat. No. 3,872,019, the disclosures of which are hereby incorporated by reference.

Similarly, other primary or secondary amine-substituted polymers used as viscosity-index improvers may be used as starting materials for the additives of the invention. Such polymers include amine-grafted acrylic polymers and copolymers and copolymers wherein one monomer contains at least one amino group. Typical compositions are described in British Pat. No. 1,488,382, U.S. Pat. No. 4,089,794 and U.S. Pat. No. 4,025,452, the disclosures of which are incorporated herein by reference.

The additives of this invention are prepared by reacting a dispersant containing at least one primary or secondary amine group with sulfur dioxide. The reaction is carried out at a temperature of from 20°–200° C., preferably 80° to 150° C., by introducing sulfur dioxide into a solution of the dispersant composition in an inert diluent such as lubricating oil, xylenes, and the like. Usually 1 mol sulfur dioxide may be introduced for each 2 mols of basic nitrogen in the dispersant composition. However, from about 0.2 to about 2.0 mols of $SO_2$ per 2 mols of basic nitrogen may be used to prepare the product of this invention. The rate of the reaction is dependent upon temperature and the rate of introduction of $SO_2$. The reaction proceeds substantially to completion in from 0.1 to 100 hours. While the reaction proceeds satisfactorily at atmospheric pressure, higher or lower pressures may be used, if desired.

The lubricating oils of this invention contain an oil of lubricating viscosity and from 0.1 to 10% by weight of the additive of this invention.

Additive concentrates are also included within the scope of this invention. They usually include from about 90 to 10 weight percent of an oil of lubricating viscosity and are normally formulated to have about 10 times the additive concentration that would be used in the finished lubricating oil composition. Typical concentrates contain 10–90% by weight of the additive of this invention. The concentrates contain sufficient diluent to make them easy to handle during shipping and storage. Suitable diluents for the concentrates include any inert diluent, preferably an oil of lubricating viscosity, so that the concentrate may be readily mixed with lubricating oils to prepare lubricating oil compositions. Suitable lubricating oils which can be used as diluents typically have viscosities in the range from about 35 to about 5000 Saybolt Universal Seconds (SUS) at 100° F. (38° C.), although any oil of lubricating viscosity can be used.

A variety of lubricating oils can be used to prepare a lubricating oil composition or concentrate. These oils are of lubricating viscosity derived from petroleum or synthetic sources.

Natural oils include animal oils and vegetable oils (e.g., castor oil, lard oil) as well as liquid petroleum oils and solvent-treated or acid-treated mineral lubricating oils of the paraffinic, naphthenic or mixed paraffinic-naphthenic types. Oils of lubricating viscosity derived from coal or shale are also useful base oils. Synthetic lubricating oils include hydrocarbon oils and halosubstituted hydrocarbon oils such as polymerized and interpolymerized olefins [e.g., polybutylenes, polypropylenes, polypropylene-isobutylene copolymers, chlorinated polybutylenes, poly(1-hexenes), poly(1-octenes), poly(1-decenes), etc., and mixtures thereof]; alkylbenzenes [e.g., dodecylbenzenes, tetradecylbenzenes, dinonylbenzenes, di-(2-ethylhexyl)benzenes, etc.]; polyphenyls [e.g., biphenyls, terphenyls, alkylated polyphenyls, etc.], alkylated diphenyl ethers and alkylated diphenyl sulfides and the derivatives, analogs and homologs thereof, and the like.

Alkylene oxide polymers and interpolymers and derivatives thereof where the terminal hydroxyl groups have been modified by esterification, etherification, etc., constitute another class of known synthetic lubricating oils. These are exemplified by the oils prepared through polymerization of ethylene oxide or propylene oxide, the alkyl and aryl ethers of these polyalkylene polymers (e.g., methylpolyisopropylene glycol ether having an average molecular weight of 1000, diphenyl ether of polypropylene glycol having a molecular weight of 500-1000, diethyl ether of polypropylene glycol having a molecular weight of 1000-1500, etc.) or mono- and polycarboxylic esters thereof, for example the acetic acid esters, mixed $C_3$-$C_8$ fatty acid esters, or the $C_{13}$Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acids, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.). Specific examples of these esters include dibutyl adipate, di-(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mol of sebacic acid with two mols of tetraethylene glycol and two mols of 2-ethylhexanoic acid, and the like.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants [e.g., tetraethyl silicate, tetraisopropyl silicate, tetra-(2-ethylhexyl) silicate, tetra-(4-methyl-2-ethylhexyl) silicate, tetra-(p-tert-butylphenyl) silicate, hexyl-(4-methyl-2-pentoxy) disiloxane, poly-(methyl) siloxanes, poly(-methylphenyl) siloxanes, etc.]. Other synlubricating oils include liquid esters of phosphorus-containing acids (e.g., tricresyl phosphate, trioctyl phosphate, diethyl ester of decylphosphonic acid, etc.), polymeric tetrahydrofurans and the like.

Unrefined, refined and rerefined oils (and mixtures of each with each other) of the type disclosed hereinabove can be used in the lubricant compositions of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils, except they have been further treated in one or more purification steps to improve one or more properties. Many such purification techniques are known to those of skill in the art such as solvent extraction, acid or base extraction, filtration, percolation, etc. Rerefined oils are obtained by processes similar to those used to obtain refined oils applied to refined oils which have been already used in service. Such rerefined oils are also known as reclaimed or reprocessed oils, and often are additionally processed by techniques directed to removal of spent additives and oil breakdown products.

Other conventional additives which can be used in combinations with the additive composition of this invention include oxidation inhibitors, rust inhibitors, antifoam agents, viscosity index improvers, pour-point depressants, dispersants and the like. These include such compositions as chlorinated wax, benzyl disulfide, sulfurized olefins, sulfurized terpene, phosphorus esters such as trihydrocarbon phosphites, metal thiocarbamates such as zinc dioctyldithiocarbamate, metal phosphorus dithioates such as zinc dioctylphosphorodithioate, polyisobutylene having an average molecular weight of 100,000, etc.

The lubricating oil compositions of the invention are useful for lubricating internal combustion engines, automatic transmissions and as industrial oils such as hydraulic oils, heat-transfer oils, torque fluids, etc. The lubricating oils can not only lubricate the engines but, because of their dispersancy properties, help maintain a high degree of cleanliness of the lubricated parts.

EXAMPLES

The following examples are provided to illustrate the invention. It is to be understood that they are provided for the sake of illustration only and not as a limitation on the scope of the invention.

EXAMPLE 1

To a 3-liter reaction flask was added 880 g of a commercial succinimide dispersant composition prepared from polyisobutenyl succinic anhydride (where the polyisobutenyl group has a number average molecular weight of about 980) and tetraethylenepentaamine and 1120 g diluent lubricating oil. The mixture was heated to 150° C. under nitrogen with stirring. The product was then sparged with $SO_2$ at the rate of 220 cc $SO_2$/minute for 150 minutes followed by sparging with nitrogen for 150 minutes at 150° C. The product weighed 2048 g (including oil) and contained 1.99% N and 1.78% S.

EXAMPLE 2

Following the procedure of Example 1, 1000 g of a commercial succinimide dispersant composition prepared from polyisobutenyl succinic anhydride (where the polyisobutenyl group has a number average molecular weight of 980) and triethylenetetraamine in 1000 g lubricating oil diluent was reacted with $SO_2$ at the rate of 220 cc $SO_2$/minute for 180 minutes to yield 2054 g product (including oil) containing 1.94% N and 1.56% S.

EXAMPLE 3

To a 3-liter reaction flask was added 600 g of a commercial hydrocarbyl amine detergent prepared from polyisobutenyl chloride (where the polyisobutenyl group has a number average weight of 1325) and ethylenediamine, 140 g diluent lubricating oil and 850 ml xylenes. The reaction mixture was then sparged with 13.3 liters of $SO_2$ over a 60-minute period. During the addition of the $SO_2$, the reaction temperature rose from 20° C. to 33° C. At the end of the $SO_2$ addition, the reaction mixture was brought to reflux (132° C.) and sparged with nitrogen for 60 minutes. Solvents were removed by stripping to 150° C. and 12 mm Hg. The product was diluted with 459 g of diluent lubricating oil. The final product weighed 1200 g and contained 0.93% N and 1.02% S.

EXAMPLE 4

A 5-liter reaction flask was charged with 993 g xylenes, 500 g of a succinimide obtained by reacting two mols of a polyisobutenyl succinic anhydride of about 1100 MW with one mol of triethylenetetramine and 493 g diluent lubricating oil. While stirring at 130° C., 12.4 liters of $SO_2$ was bubbled through the reaction mixture over a 2-hour period. The reaction was stirred for another hour at 130° C., then for 15 hours at ambient temperatures. The reaction mixture was stripped to 160° C./2 mm Hg for 0.5 hours to give 983 g of product (N=1.56%, S=0.50%).

EXAMPLE 5

A 2-liter reaction flask was charged with 483 g xylenes and 483 g of a succinimide prepared by reacting 1.1 mol of a polyisobutylene succinic anhydride of about 400 MW with one mol of triethylenetetraamine. While stirring at 130° C., 9.0 liters of $SO_2$ was bubbled through the reaction mixture over a period of 90 minutes. The reaction was stirred at 130° C. for another 120 minutes, then stripped to 155° C./0.5 mm Hg for 0.5 hour to give 441 g of product (N=3.47%; S=1.97%).

EXAMPLE 6

A 2-liter reaction flask was charged with 487 g xylenes and 487 g of Amoco 9250 (1.15% N; a borated Mannich dispersant prepared by reacting a polyisobutenyl-substituted phenol with formaldehyde and a polyamine and then borating). While stirring at 130° C., 5.4 liters $SO_2$ was introduced over a 54-minute period. The reaction mixture was stirred at 130° C. for 4 hours before introducing another 5.4 liters $SO_2$. The contents were stirred at 130° C. for another 16 hours and then stripped to give 482 g of product (N=1.06; S=11.1).

EXAMPLE 7

A 1-liter reaction flask was charged with 190 g xylenes and 190 g of a poly(oxyalkylene)aminocarbamate prepared by reacting a hydrocarbyl-capped poly(butylene oxide) chloroformate of approximately 1400 MW with ethylenediamine. While stirring at 130° C., 1.7 liters $SO_2$ was introduced over a period of 34 minutes. The reaction mixture was stirred an additional 3 hours at 130° C., then stripped to 150° C./2.5 mm Hg for 0.5 hour. Recovered was 193 g of product (N=1.28%, S=0.74%).

EXAMPLE 8

To a 10-gallon stainless-steel reactor was charged 7905 g of a commercial succinimide dispersant composition prepared from polyisobutenyl succinic anhydride (where the polyisobutenyl group has a number average molecular weight of 980) and triethylenetetraamine in 7905 g of lubricating oil diluent. The mixture was heated to 130° C. under nitrogen and 633 g $SO_2$ was added over a period of 80 minutes. The temperature increased to 135° C. and the reactor pressure reached 1.36 kg. At the end of the $SO_2$ addition, the product was sparged for 120 minutes with nitrogen. The product was filtered to give 12,100 g of material containing 2.08% N and 1.50% S.

EXAMPLE 9

To a 500-ml reaction flask was added 88 g of a commercial succinimide dispersant composition prepared from polyisobutenyl succinic anhydride (where the polyisobutenyl group has a number average molecular weight of about 980) and tetraethylenepentamine and 12 g diluent lubricating oil. The mixture was heated to 150° C. with stir-ring. The mixture was sparged with $SO_2$ at the rate of 220 cc $SO_2$/minute for 10 minutes, followed by sparging with nitrogen for 10 minutes. The product contained 1.92% N and 1.12% S.

EXAMPLE 10

To a 1-liter stirred autoclave was charged 22 g of an amine-functionalized ethylene-propylene rubber of 30,000-200,000 MW in 178 g of lubricating diluent oil. The mixture was warmed to 120° C. and 2.44 g $SO_2$ was added. The reaction mass was stirred at 120° C. for 1 hour, then sparged with nitrogen for 30 minutes at 120° C. The product contained 0.06% N and 0.11 S.

EXAMPLE 11

To a 1-liter stirred autoclave was added 200 g of an amide detergent composition prepared from an aliphatic carboxylic acid of approximately 280 molecular weight and tetraethylenepentamine (where the ratio of carboxylic acid to polyamine is approximately 3 to 1). The mixture was heated to 120° C. under nitrogen and 22.76 g of $SO_2$ was added. The reaction mass was stirred at 120° C. for one hour, then sparged with nitrogen for 30 minutes at 120° C. The product contained 5.7% N and 2.86% S.

EXAMPLE 12

The compositions of this invention were tested in a Caterpillar 1-G2 test in which a single-cylinder diesel engine having a 5⅛" bore by 6½" stroke is operated under the following conditions: timing, degrees BTDC, 8; brake mean effective presure, psi 141; brake horsepower 42; Btu's per minute 5850; speed 1800 RPM; air boost, 53" Hg absolute, air temperature in, 255° F.; water temperature out, 190° F.; and sulfur in fuel, 0.4%w. At the end of each 12 hours of operation, sufficient oil is drained from the crankcase to allow addition of 1 quart of new oil. In the test on the lubricating oil compositions of this invention, the 1-G2 test is run for 120 hours. At the end of the noted time period, the engine is dismantled and rated for cleanliness. The Institute of Petroleum Test Number 247/69 merit rating system for engine wear and cleanliness, accepted by ASTM, API and SAE, is the rating system used to evaluate the engine. The over-all cleanliness is noted as WTD, which is the summation of the above numbers. Lower values represent cleaner engines.

The base oil used in these tests is a mid-Continent base stock SAE 30 oil containing 18 mmols/kg of a zinc dihydrocarbyl dithiophosphate, 37 mmols/kg of a calcium phenate, and the amount noted in the table of detergent.

| Test Results 1-G2 Caterpillar Test (120 Hours) | | | | |
| --- | --- | --- | --- | --- |
| Detergent | Grooves | Lands | Under-head | WTD |
| 1. 8% succinimide | 55.6-7.1-1.8-0.9 | 485-170-55 | 5.2 | 424 |
| derived from poly- | 72.3-6.3-2.1-1.1 | 565-240-75 | 5.8 | 605 |

Test Results 1-G2 Caterpillar Test (120 Hours)

| Detergent | Grooves | Lands | Under-head | WTD |
|---|---|---|---|---|
| isobutenyl succinic anhydride & triethylenetetraamine in oil (50% actives) (duplicate runs) | | | | |
| 2. 8% product of Example 2* (50% actives) | 73.3-3.8-1.8-0.7 | 290-80-25 | 4.0 | 355 |
| 3. 5% hydrocarbyl polyamine prepared from polyisobutylene chloride & ethylenediamine (80% actives). | 65.7-5.1-1.6-1.0 | 440-210-110 | 7.9 | 515 |
| 4. 8% Product of Example 3 (50% actives) | 70.0-4.5-1.3-0.9 | 330-65-60 | 6.7 | 399 |

*The succinimide used as starting material in Example 2 is identical to that tested in Test No. 1 above.

These test results illustrate the superiority of the products of this invention in their ability to promote cleanliness of the engine and in particular their ability to deter formation of deposits on the lands.

What is claimed is:

1. A process for preparing a lubricating oil additive which comprises reacting at a temperature of from 20° to 200° C. an oil-soluble hydrocarbyl succinimide dispersant containing at least one primary or secondary amino group, with from 0.2 to 2 mols of $SO_2$ for every two mols of basic nitrogen present in said dispersant.

2. The process of claim 1 wherein said succinimide is prepared from a polyisobutylene succinic anhydride and triethylene tetraamine or tetraethylene pentamine.

* * * * *

UNITED STATES PATENT AND TRADEMARK OFFICE
CERTIFICATE OF CORRECTION

PATENT NO. : 4,275,006
DATED : June 23, 1981
INVENTOR(S) : Timothy R. Erdman

It is certified that error appears in the above-identified patent and that said Letters Patent are hereby corrected as shown below:

Column 8, lines 7 and 8, "12 g" should read --112 g--.

Signed and Sealed this

Sixth Day of October 1981

[SEAL]

Attest:

GERALD J. MOSSINGHOFF

Attesting Officer

Commissioner of Patents and Trademarks